US009561488B2

(12) United States Patent
Jain et al.

(10) Patent No.: US 9,561,488 B2
(45) Date of Patent: Feb. 7, 2017

(54) PROCESS FOR PRODUCING A REGENERABLE OXIDE-BASED ADSORBENT

(71) Applicant: The Board of Trustees of the University of Illinois, Urbana, IL (US)

(72) Inventors: Prashant Jain, Urbana, IL (US); Mayank Behl, Urbana, IL (US); Mark Shannon; Junghoon Yeom, Okemos, MI (US)

(73) Assignee: The Board of Trustees of The University of Illinois, Urbana, IL (US)

( * ) Notice: Subject to any disclaimer, the term of this patent is extended or adjusted under 35 U.S.C. 154(b) by 0 days.

(21) Appl. No.: 14/973,923

(22) Filed: Dec. 18, 2015

(65) Prior Publication Data

US 2016/0101408 A1 Apr. 14, 2016

Related U.S. Application Data

(62) Division of application No. 14/067,836, filed on Oct. 30, 2013, now Pat. No. 9,248,428.

(Continued)

(51) Int. Cl.
*B01J 20/28* (2006.01)
*B01D 53/52* (2006.01)
*D04H 1/728* (2012.01)
*B01D 53/48* (2006.01)
*B01D 53/96* (2006.01)
*B01J 20/06* (2006.01)
*B01J 20/30* (2006.01)
*C01G 23/047* (2006.01)

(Continued)

(52) U.S. Cl.
CPC .......... *B01J 20/28023* (2013.01); *B01D 53/48* (2013.01); *B01D 53/52* (2013.01); *B01D 53/96* (2013.01); *B01J 20/06* (2013.01); *B01J 20/28038* (2013.01); *B01J 20/3085* (2013.01); *D04H 1/728* (2013.01); *B01D 2251/602* (2013.01); *B01D 2253/1124* (2013.01); *B01D 2253/25* (2013.01); *B01D 2253/304* (2013.01); *B01D 2257/308* (2013.01); *C01G 9/02* (2013.01); *C01G 23/003* (2013.01); *C01G 23/047* (2013.01); *Y10T 428/298* (2015.01); *Y10T 428/2913* (2015.01); *Y10T 442/60* (2015.04)

(58) Field of Classification Search
CPC ....... C01G 23/003; C01G 23/047; C01G 9/02; D01D 5/00; D01D 5/007; D01D 5/0015
USPC .......................... 423/598, 594.14, 610, 622
See application file for complete search history.

(56) References Cited

U.S. PATENT DOCUMENTS 5,271,907 A 12/1993 Copeland
5,703,003 A 12/1997 Siriwardane
5,741,469 A 4/1998 Bhore et al.

OTHER PUBLICATIONS

Ramaseshan, Zinc titanate nanofibers for the detoxification of chemical warfare simulants, 2007, The American Ceramic Society, 90, 1836-1842.*

(Continued)

*Primary Examiner* — Matthew E Hoban
*Assistant Examiner* — James Fiorito
(74) *Attorney, Agent, or Firm* — Dilworth IP, LLC

(57) ABSTRACT

A zinc titanate reactive adsorbent comprising multiphase, polycrystalline nanofibers comprising $ZnTiO_3$, $ZnO$, $TiO_2$, and $Zn_2TiO_4$.

3 Claims, 16 Drawing Sheets

Related U.S. Application Data

(60) Provisional application No. 61/721,566, filed on Nov. 2, 2012.

(51) Int. Cl.
    *C01G 23/00* (2006.01)
    *C01G 9/02* (2006.01)

(56) References Cited

OTHER PUBLICATIONS

Huang, Kinetic studies on the sulfidation and regeneration of zinc titanate desulfurization sorbent, 2008, Powder Technology, 180, 196-202.*
Gibson, J.B. & Hanson, D.P. The reaction between hydrogen sulphide and spherical pellets of zinc oxide, Ind. Eng. Chem. Proc. Des. Dev. 19, 231-237.
Lew, S., Jothimurugesan, K. & Flytzani-Stephanopolous, M. High-temperature hydrogen sulphide removal from fuel gases by regenerable zinc oxide-titanium dioxide sorbents., Ind. Eg. Chem. Res. 28, 535-541 (1989).
Lew, S., Sarofim, A.F. & Flytzani-Stephanopoulos, M. Sulphidation of zinc titanate and zinc oxide solids. Ind. Eng. Chem. Res. 31, 1890-1899 (1992).
Siriwardane, R.V. & Poston, J.A. Interaction of H2S with zinc titanate in the presence of H2 and CO. Appl. Surf. Sci. 45, 131-139 (1990).
Siriwardane, R.V., Poston, J.A. & Evans, G. Spectroscopic characterization of molybdenum-containing zinc titanate desulphurization sorbents. Ind. Eng. Chem. Res. 33, 2810-2818 (1994).
Poston, J.A. A reduction in the spalling of zinc titanate desulphurization sorbents through the addition of lanthanum oxide. Ind. Eng. Chem. Res. 35, 875-882 (1996).
Kobayashi, M., Shirai, H. & Nunokawa, M. Investigation on desulfurization performance and pore structure of sorbents containing zinc ferrite. Energy Fuels 11, 887-896 (1997).
Lew, S., Sarofim, A. F & Flytzani-Stephanopoulos, M. The reduction of zinc titanate and zinc oxide solids. Chem. Eng. Sci., 47, 1421-1431(1992).
Jothimurugesan, K. & Gangwal, S.K. Regeneration of zinc titanate H2S sorbents. Ind. Eng. Chem. Res. 37, 1929-1933 (1998).
Sa, L.N., Focht, G.D., Ranade, P.V. & Harrison, D.P. High-temperature desulphurization ising zinc ferrite: Solid structural property changes. Chem. Eng. Sci. 44, 215-224 (1989).
Skrzypski, J., Bezverkhyy, J., Heintz, O. & Bellat, J. Low temperature H2S removal with metal-doped nanostructure ZnO sorbents: Study the origin of enhanced reactivity in Cu-containing materials. Ind. Eng. Chem. Res. 50, 5714-5722 (2011).
Flytzani-Stephanopoulos, M., Sakbodin, M. & Wang, Z. Regenerative adsorption and removal of H2S from hot fuel gas streams by rare earth oxides. Science 312, 1508-1510 (2006).
Efthimiadis, E.A. & Sotirchos, S.V. Reactivity evolution during sulphidation of porous zinc oxide. Chem. Eng. Sci. 48, 829-843 (1993).
Carnes, C.L. & Klabunde, K.J. Unique chemical reactivities of nanocrystalline metal oxides toward hydrogen sulphide. Chem. Mater 14, 1806-1811 (2002).
Li, D. & Xia, Y. Fabrication of titania nanofibres by electrospinning. Nano Lett. 3, 555-560 (2003).
Ramaseshan, R., Sundarrajan, S., Jose, R. & Ramakrishna, S. Nanostructured ceramics by electrospinning. J. Appl. Phys. 102, 111101 (2007).
Dai, Y., Liu, W., Fomo, E, Sun, Y. & Xia, Y. Ceramic nanofibres fabricated by electrospinning and their applications in catalysis, environmental science, and energy technology. Polym. Adv. Technol. 22, 326-338 (2011).
Liu, R., Ye, H., Xiong, X. & Liu, H. Fabrication of TiO2/ZnO composite nanofibres by electrospinning and their photocatalytic property. Mater. Chem. Phys. 121, 432-439 (2010).
Manik, S. K. & Pradhan, S. K. Preparation of nanocrystalline microwave dielectric Zn2TiO4 and ZnTiO3 mixture and X-ray microstructure characterization by Rietveld method. Physica E: Lowdimensional Systems and Nanostructures 33, 69-76 (2006).
Zevenhoven, C.A.P., Yrjas, K.P. & Hupa, M.M. Hydrogen sulphide capture by limestone and dolomite at elevated pressure-2. Sorbent particle conversion modeling. Ind. Eng. Chem.Res. 35, 943-949 (1996).
Shen, G., Chen, D. & Lee, C.J. Hierarchical saw-like ZnO nanobelt/ZnS nanowire heterostructures induced by polar surfaces. J. Phys. Chem. B 110, 15689-15693 (2006).
Yin, Y.D. et al. Formation of hollow nanocrystals through the nanoscale Kirkendall effect. Science 304, 711-714 (2004).
Moore, D. & Wang, Z.L. Growth of anisotropic one-dimensional ZnS nanostructures. J. Mater. Chem. 16, 3898-3905 (2006).
Qadri, S.B. et al. Size-induced transition-temperature reduction in nanoparticles of ZnS. Phys. Rev. B 60, 9191-9193 (1999).
Wang, Z. et al. Morphology-tuned wurtzite-type ZnS nanobelts. Nature Mater. 4, 922-927 (2005).
Schultze, D., Steinike, U., Kussin, J. & Kretzschmar, U. Thermal oxidation of ZnS modifications sphalerite and wurtzite. Cryst. Res. Technol. 30, 553-558 (1995).
Grunze, M. & Hirschwald. W. Vacuum microbalance investigations of heterogeneous surface reaction mechanisms. J. Vac. Sci. Technol., 11, 424-428 (1974).
Garcia, E, Cillenielo, C., Ibarra, J., Pineda, M., & Palacios, J. M. Kinetic Study of High-Temperature Removal of H2S by Novel Metal Oxide Sorbents. Ind. Eng. Chem. Res. 36, 846-853 (1997).
Zongying, Fabrication of zinc titanate nanofibers by electrospinning technique, Sep. 16, 2009, Journal of Alloys and Compounds, 489, 167-169.

* cited by examiner

PROCESS FOR PRODUCING A REGENERABLE OXIDE-BASED ADSORBENT

This application is a divisional application of U.S. application Ser. No. 14/067,836, filed on Oct. 30, 2013, now allowed, claiming the benefit of U.S. Provisional Application No. 61/721,566, filed on Nov. 2, 2012; the disclosure of U.S. application Ser. No. 14/067,836 and U.S. Provisional Application No. 61/721,566, each as filed, is incorporated herein by reference.

GOVERNMENT LICENSE RIGHTS

This invention was made with government support under Grant number CTS-0120978 awarded by NSF. The government has certain rights in the invention.

FIELD OF THE INVENTION

The invention relates to zinc titanate reactive adsorbents. More particularly, the invention relates to zinc titanate reactive adsorbents containing multiphase, polycrystalline nanofibers.

BACKGROUND OF THE INVENTION

Roughly eighty percent of energy consumption in the United States is derived from fossil fuels. Conversion of these raw fuels to process streams that are more readily usable has long been possible, however, in recent decades due to more stringent environmental regulations, there has been increasing emphasis on also minimizing the presence of sulfur-containing compounds in the process streams. These sulfur compounds are present in fossil fuels, whether the fuel is liquid (crude oil), solid (coal), or gas (natural gas). Methods for removing sulfur, or converting it to more readily-processable forms are so important that it is sometimes necessary to operate entire refinery units specifically devoted to that purpose. For example, fluid catalytic cracking units, which process downstream derivative streams of crude oil, often pretreat their feed in hydrotreating units to convert sulfur-containing compounds to materials that do not boil in the gasoline range. In the treatment of natural gas or coal-derived syngas, hydrogen sulfide ($H_2S$) is found. Hydrogen sulfide not only presents environmental concerns, but is poisonous to catalysts and corrosive to metals, and therefore needs to be removed from the process streams. This is often achieved using metal oxides as reactive adsorbents, but such materials often perform poorly when subjected to repeated cycles of sulfidation and re-oxidation because of complex structural and chemical changes. Cyclic use of the adsorbent degrades its performance for a variety of reasons, including grain growth-led reduction in specific surface area (sintering), sorbent underutilization due to diffusion-limited gas solid reactions, mechanical spalling (adsorbent breakup) due to reaction and heat induced volumetric changes, and formation of non-regenerable, thermodynamically stable side products.

The bulk of research in this area has mainly focused on modifying sorbent chemical composition. However, because the overall gas-solid reaction is often controlled by diffusion, tuning chemical properties alone limits the number of possible solutions. Conventional pellet-based sorbent designs are transport limited in sulfur uptake, which exposes the outermost layers to disproportionately longer durations, in comparison to the pellet interior, leading to sorbent fragmentation. Nanosized $H_2S$ adsorbents, with their large specific surface areas and short diffusion lengths, would seem to be more appropriate when using such an approach. However, in addition to size, the choice of sorbent morphology is also important. Particulate-based adsorbents tend to aggregate and sinter together under high temperature cycling, causing diffusion barriers similar to bulk sorbents. Therefore, a sorbent morphology that promotes faster overall kinetics while simultaneously preventing progressive material underutilization is highly desirable.

Work has been ongoing to develop improved adsorbents. U.S. Pat. No. 5,271,907 discloses high temperature desulfurization of coal-derived gases using regenerable sorbents. U.S. Pat. No. 5,703,003 discloses durable, regenerable sorbent pellets for removal of hydrogen sulfide from coal gas. U.S. Pat. No. 5,741,469 discloses a dry, regenerable solid oxide process for converting $SO_x$ in flue gas streams to elemental sulfur without using a Claus unit. Nevertheless, a continuing need exists for reactive adsorbents with high levels of reactivity that are capable of withstanding multiple cycles of sulfidation/regeneration while maintaining activity. It has unexpectedly been found that zinc titanate based adsorbents with a nanofibrous morphology exhibit high sulfur removal capacity over multiple regeneration cycles, accompanied by rapid reaction rates. The nanofibrous morphology overcomes transport-related limitations, and enables complete material utilization by promoting reaction-controlled kinetics. In-situ nanoscale stabilization of the adsorbent's ZnS wurtzite phase and the growth of rate-enhancing hierarchical structures further facilitate sorbent regeneration.

SUMMARY OF THE INVENTION

In one embodiment, the invention relates to a zinc titanate reactive adsorbent comprising multiphase, polycrystalline nanofibers comprising $ZnTiO_3$, $ZnO$, $TiO_2$, and $Zn_2TiO_4$.

In another embodiment, the invention relates to a process for producing a zinc titanate reactive adsorbent involving electrospinning a solution of an organic zinc-containing compound and a titanium-containing compound to provide a zinc titanate reactive adsorbent comprising multiphase, polycrystalline nanofibers comprising $ZnTiO_3$, $ZnO$, $TiO_2$, and $Zn_2TiO_4$.

In still another embodiment, the invention relates to a process for reducing sulfur levels in a gas stream, the process comprising contacting a zinc titanate adsorbent comprising multiphase, polycrystalline nanofibers comprising $ZnTiO_3$, $ZnO$, $TiO_2$, and $Zn_2TiO_4$, and a sulfur-containing gas stream.

In another embodiment, the invention relates to a zinc titanate reactive adsorbent comprising multiphase, polycrystalline nanofibers comprising $ZnTiO_3$, $ZnO$, $TiO_2$, and $Zn_2TiO_4$, produced by electrospinning a solution comprising an organic zinc-containing compound and a titanium-containing compound.

BRIEF DESCRIPTION OF THE DRAWINGS

FIG. 14b illustrates the SEM image of the fiber mat of FIG. 14a.

DETAILED DESCRIPTION OF THE INVENTION

Figure 1A:
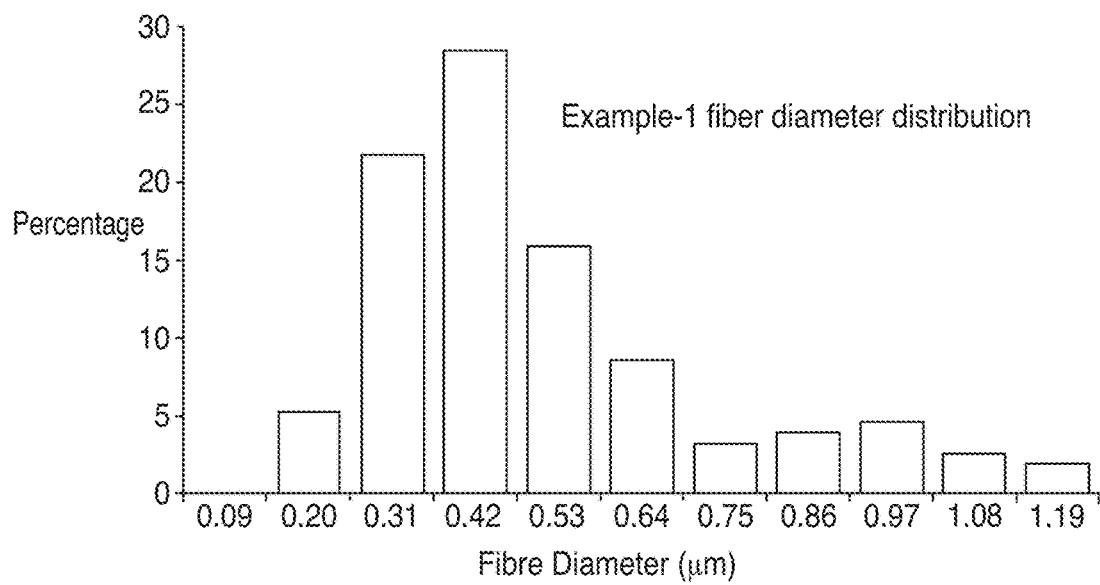
FIG. 1a illustrates a fiber diameter size distribution for fresh fibers of Example 1.

The zinc titanate reactive adsorbents described below are capable of sustaining their initial reactivity and sulfur removal capacity over multiple regeneration cycles. Due to their nanofibrous morphology, these absorbents exhibit rapid reaction rates which overcome the gas-transport limitations characteristic of conventional pellet-based sorbents, allow all of the adsorbent material to be used efficiently, and resist spalling. Moreover, because of their high reactivity, regeneration temperatures for the adsorbents can be maintained at temperatures as low as the sulfidation step, i.e., the same temperature at which the reactive adsorbent picks up sulfur. This reduces energy usage and prevents damage to the adsorbent. The efficient adsorbent regeneration is further aided by structural features such as the growth of secondary hierarchical nanostructures and the preferential stabilization of a wurtzite phase in the sulfidation product.

In one embodiment, the invention relates to a zinc titanate reactive adsorbent comprising multiphase, polycrystalline nanofibers comprising $ZnTiO_3$, ZnO, $TiO_2$, and $Zn_2TiO_4$.

Electrospinning Process

The zinc titanate reactive adsorbents are made by an electrospinning process. In such processes, high voltage is applied to a capillary filled with a liquid, such as the reactants for zinc titanate. Liquid droplets exiting the capillary have a surface charge, and the associated electrostatic repulsion counteracts the surface tension of the droplet. The droplet elongates and forms the so-called Taylor cone. At sufficiently high voltages, a stream of liquid erupts from the surface of the cone, directed toward a grounded collector in the direction of the electric field. The stream of liquid accelerates in a line that is initially straight, but because of electrostatic instabilities becomes increasingly erratic as it approaches the grounded collector, forming multiple small diameter filaments. Liquid in the stream evaporates in the course of its flight, so that very fine solid fibers are deposited on the grounded collector. Accordingly, the fiber diameters of the zinc titanate reactive adsorbents are from 300 to 1300 nm, preferably from 350 to 800 nm, more preferably from 400 to 500 nm. Nanometer-sized grains of the fibers are also measured using SEM images. The Feret diameters for these grains range from 15 to 200 nm, preferably from 25 to 90 nm.

The nanofibers also contain secondary nanorod branching, with the nanorods having a diameter from 50 to 200 nm and a length of 500 nm to 8 µm. The secondary growth of nanorods is anistropic. Grains attached to the nanorods typically have a mean grain size of 25 to 65 nm. The secondary nanorod branching facilitates the maintenance of high specific surface area and low overall diffusional resistance, thus enabling high sorbent efficiency over multiple cycles of operation.

Solutions used in the electrospinning process include an organic zinc-containing compound and a titanium-containing compound, which react to form a zinc titanate. Preferably, the organic zinc-containing compound is selected from a zinc organic salt, more preferably from a zinc salt of acetic acid; and the titanium-containing compound is selected from a titanium alkoxide, more preferably from titanium isopropoxide. Most preferably, the organic zinc-containing compound is zinc acetate dihydrate and the titanium-containing compound is titanium (IV) isopropoxide.

The nanofibers produced by the electrospinning process form a nanofiber mat. Following electrospinning, this mat is typically vacuum dried, and then heated at 300 to 650° C. to remove residual organic components.

Typical BET surface areas for the produced nanofibers range from 90.2 to 151.7 $m^2/g$.

The individual nanofibers are multi-phase and polycrystalline, and contain crystalline phases of $ZnTiO_3$ (ilmenite), ZnO (zincite), $TiO_2$ (rutile and anatase), and $Zn_2TiO_4$ (inverse-spinel). The nanofibers also preferably have a ratio of Zn/Ti from 3.7 to 0.8. The secondary nanorod branches have a ratio Zn/Ti higher than the Zn/Ti of the primary fiber.

For the purpose of this specification, the terms "multiphase" and "polycrystalline" means a mixture of different mineral phases and each phase is formed from multiple crystallites or grains of different sizes and orientations.

Sulfided Nanofiber Morphology

The zinc titanate adsorbent chemically reacts with sulfur compounds, binding them to the adsorbent as hexagonal ZnS (wurtzite). This stands in contrast to the formation of ZnS in the more common sphalerite phase (cubic). Formation of the wurtzite phase is beneficial during regeneration because wurtzite ZnS tends to oxidize directly to ZnO, whereas the oxidation of ZnS in the sphalerite phase has been linked with the formation of $ZnSO_4$ and $Zn_3O(SO_4)_2$. Zinc sulfate does not form in the sulfidation of the subject zinc titanate adsorbents. This is advantageous since $ZnSO_4$ is thermodynamically stable, which requires higher temperatures for regeneration. Higher regenerator temperatures in turn cause accelerated thermal sintering and physical degradation of the adsorbent.

For the purposes of this specification, the term "sulfided" or "sulfidation" means being exposed to 200 ml $min^{-1}$ gas stream containing 1% $H_2S$ in $N_2$ (by volume) at temperatures 500, 550, 600 and 650° C.

Formation of wurtzite ZnS on the surface of the zinc titanate adsorbent is in the form of hierarchical nanostructures of ZnS. This contrasts to conventional sulfidation on pellet adsorbents, where the reaction products grow as a shell over the reacting oxide core, creating transport limitations and reducing the amount of adsorbent that can effectively be utilized.

For the purpose of this specification, the term "hierarchical structures of ZnS" means the appearance of nanorods on the as-synthesized fibers after being sulfided.

In a second embodiment, the present invention relates to a process for producing a zinc titanate reactive adsorbent comprising electrospinning a solution, the solution comprising an organic zinc-containing compound and a titanium-containing compound. The zinc titanate adsorbent comprises multiphase, polycrystalline nanofibers comprising $ZnTiO_3$, ZnO, $TiO_2$, and $Zn_2TiO_4$. The electrospinning process, organic zinc-containing compound and titanium-containing compound are as described above.

In a third embodiment, the present invention relates to a process for reducing sulfur levels in a gas stream, the process comprising contacting a zinc titanate adsorbent comprising multiphase, polycrystalline nanofibers comprising $ZnTiO_3$, ZnO, $TiO_2$, and $Zn_2TiO_4$, and a sulfur-containing gas stream. The zinc titanate adsorbent is as described above. The sulfur-containing gas stream can be any of those typically encountered in industry where sulfur reduction is required, e.g., fuel gas streams in coal gasification processes. In such cases, the zinc titanate adsorbent is subjected to conditions which cycle between a sulfur-rich, reducing environment, and one which is oxidative. The sulfur reacts with the zinc titanate in the sulfur-rich, reducing environment to form hierarchichal structures of wurtzite. The sulfur in the gas stream can be hydrogen sulfide or carbonyl sulfide. Preferably, the sulfur in the gas stream is hydrogen sulfide. Sulfur concentrations in the sulfur-rich, reducing environment are preferably from 0.75 to 1.5 volume percent. Temperatures in the sulfur-rich, reducing environment range from 500 to 650° C.

In the oxidative environment, sulfur on the adsorbent is removed as sulfur dioxide. Temperatures range from 500 to 650° C. Preferably, the temperature of the oxidative environment is substantially the same as that of the sulfur-rich environment, i.e., within 5° C.

The following Examples further detail and explain the preparation and performance of the inventive zinc titanate adsorbents, and demonstrate their efficacy as sulfur reducing agents for use with sulfur-containing gas streams. Those skilled in the art will recognize many variations that are within the spirit of the invention and scope of the claims.

Examples 1 and 2

Synthesis

Precursor solutions for electrospinning in the synthesis of Example 1 were prepared by dissolving 8.2 g zinc acetate dihydrate (($CH_3COO)_2.Zn.2H_2O$, 97%, Alfa Aesar) and 10 mL of titanium (IV) isopropoxide ($C_{12}H_{28}O_4Ti$, Sigma Aldrich, 97%) into 25 mL of ethanol (ACS grade, 99%). 3.5 mL of glacial acetic acid was added to the mixture to prevent titanium isopropoxide from precipitating. All the chemicals were mixed at 55° C. using a magnetic stirrer until a clear solution was obtained. To facilitate the electrospinning process, a 10% polymeric solution of PVP (MW~1300000, Sigma-Aldrich) in ethanol was added to the mixture, which was further stirred for 6 h. The resultant solution was fed at 1.2 mL/h using a syringe pump to a flat tip, 20-gauge, stainless steel needle that was connected to a high-voltage power supply. A voltage of 19 kV was applied and a grounded aluminum mesh, separated by 17 cm from the needle tip, was used as a collector. The as-spun composite inorganic-organic fiber mat thus obtained was vacuum dried for 3 h at 110° C. Subsequently, the mat was heated at 340° C. for 2 h to remove residual organic components and finally at 600° C. for 4 h. Fiber mats with a different composition (Example 2) were obtained by adjusting the ratio of Zn/Ti in the precursor solution. Example 2 was spun for a smaller duration of time (several minutes) in contrast to Example 1 (several hours). Moreover, Example 2 was sintered at 600° C. for 3.5 h.

Characterization

Figure 1B:
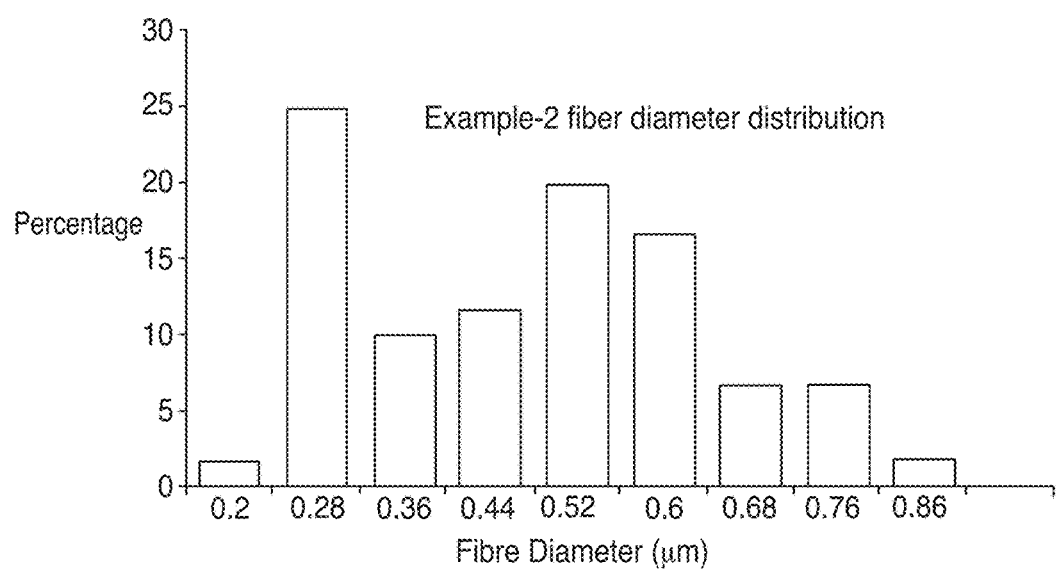
FIG. 1b illustrates a fiber diameter size distribution for fresh fibers of Example 2.

Wide angle (20-85°) x-ray diffraction (XRD) patterns were collected on a Philips X-ray diffractometer (X'pert MPD Pro®) with Cu Kα radiation (λ=1.54 Å). All the major peaks were identified and assigned to the appropriate crystal phases in accordance with JCPDS database. The phase compositions were calculated by carrying out profile fitting of the diffraction peaks using MDI-Jade®. Scanning Electron Microscopy (SEM) analysis was carried out using a JEOL 6060LV® and Hitachi S-4700 (a field-emission instrument). The fiber/grain diameters were estimated using image processing software (Image-J). FIGS. 1a and 1b summarize the fiber size distribution for the fresh sorbent specimens Examples 1 and 2, respectively. TEM images were taken using JEOL 2010LaB6, operated at 200 kV. STEM-HAADF images were taken on JEOL 2010F. X-ray photo-electron spectroscopy (XPS) analysis was done using Kratos Axis ULTRA, which employed a monochromatized Al Kα X-ray source of 15 kV (~10 mA).

Example 1

Figure 14A:
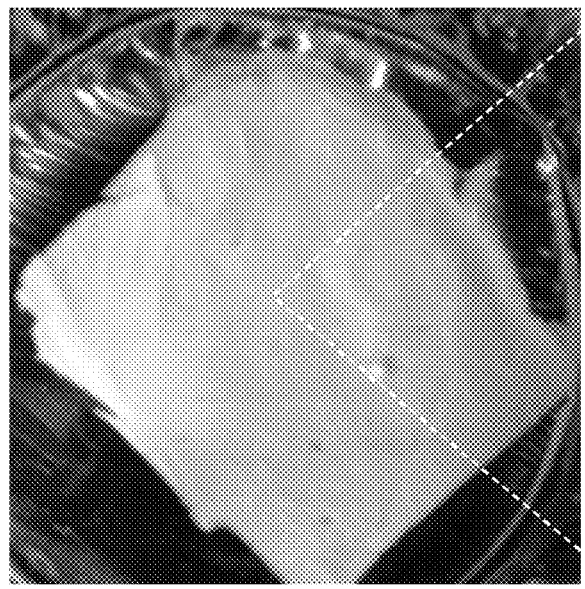
FIG. 14a illustrates a fiber-mat for fibers of Example 1 after calcination at 600° C.
Figure 14B:
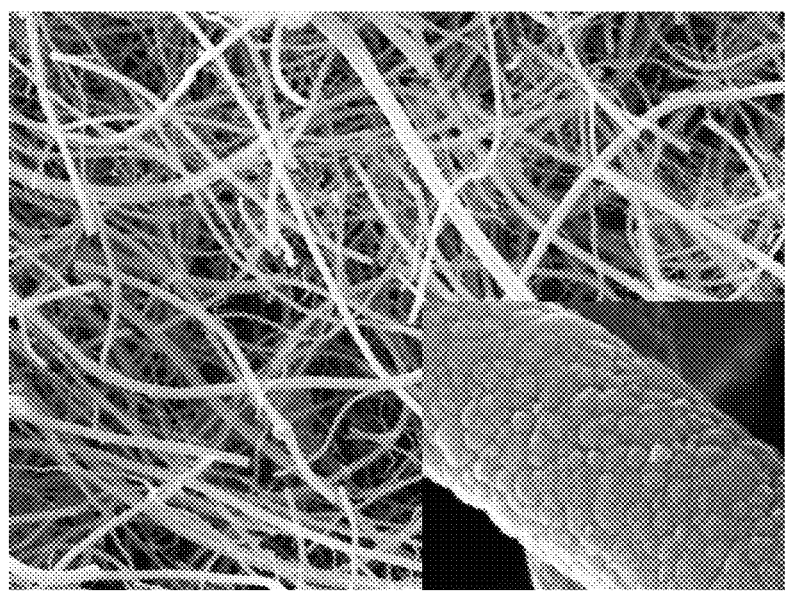

The resultant fiber-mat after calcination at 600° C. is shown in FIG. 14a. FIG. 14b shows the corresponding SEM image. The Zn/Ti ratio of the fibers in the mat was 1.1. The average Feret's diameters for nanometer-sized grains on each fiber were 70 nm. The mean fiber diameters were 488 nm. The specific surface area of the fibers, estimated using BET, was 90.1 $m^2/g$.

Example 2

The Zn/Ti ratio of the fibers on the mat was 3.7. The average Feret's diameters for nanometer-sized grains on each fiber were 40 nm. This value is lower than Example 1 and can be attributed to the different electrospinning and calcination conditions between the examples. The mean fiber diameters were 435 nm. The specific surface areas, estimated using BET, were 151.7 $m^2/g$.

Multi-Phase and Polycrystalline Structures

Figure 2:
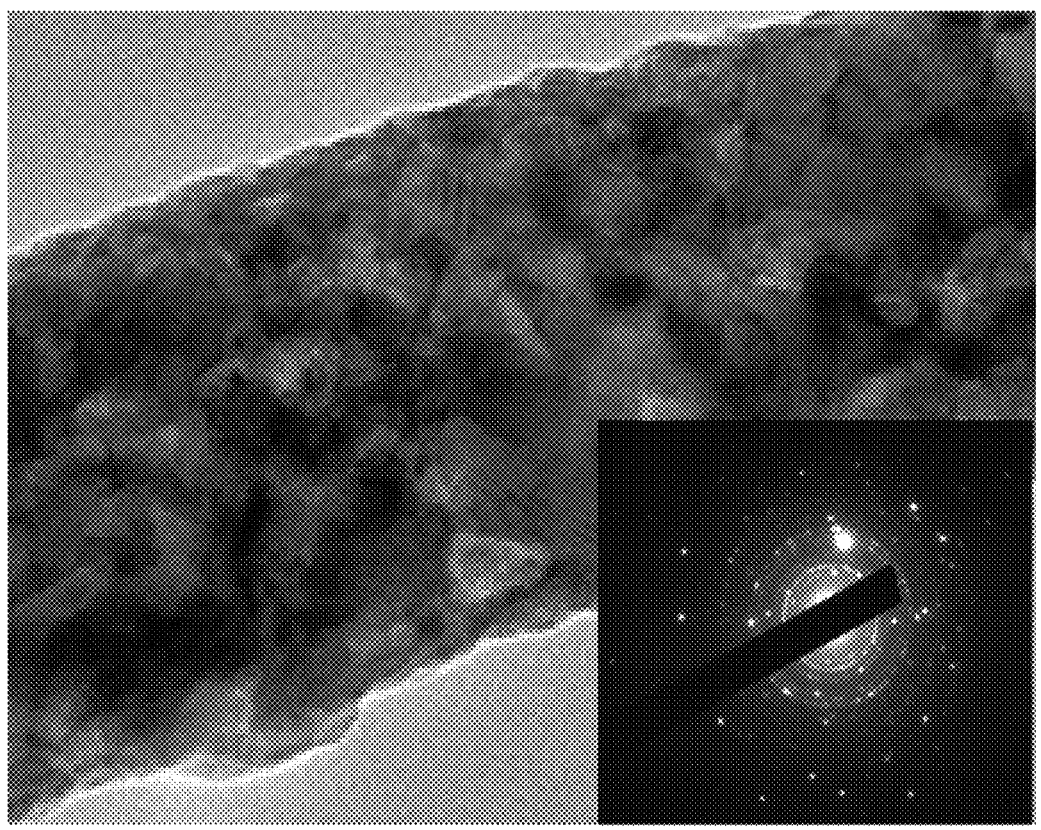
FIG. 2 is a TEM of a single fiber, and its corresponding electron diffraction pattern.
Figure 15:
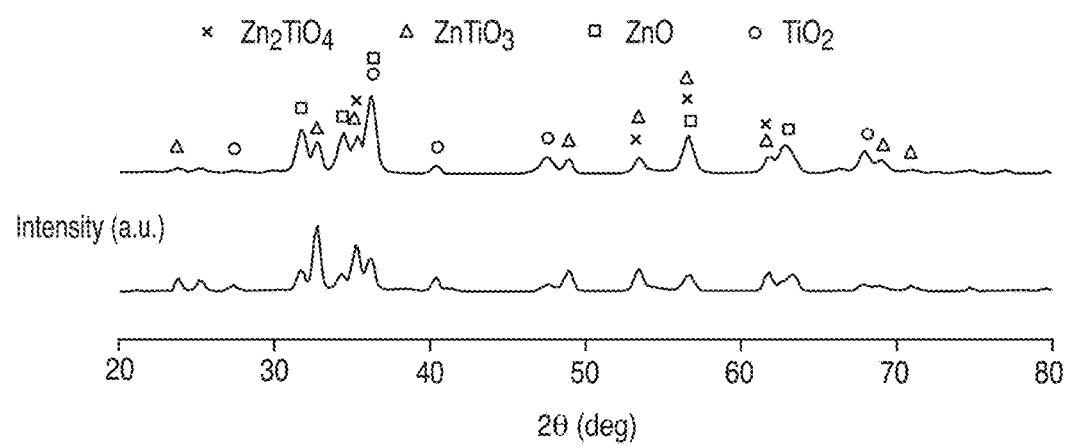
FIG. 15 is an XRD pattern for the fibers of Examples 1 and 2. Different crystalline phases identified were $ZnTiO_3$ (ilmenite), ZnO (zincite), $TiO_2$ (rutile and anatase), and $Zn_2TiO_4$ (inverse-spinel).

TEM images (FIG. 2) and corresponding electron diffraction patterns (FIG. 2 inset) confirm the individual fibers are multi-phase and polycrystalline. FIG. 15 shows the XRD spectra obtained for Examples 1 and 2. The different crystalline phases identified were $ZnTiO_3$ (ilmenite), ZnO (zincite), $TiO_2$ (rutile and anatase), and $Zn_2TiO_4$ (inverse-spinel).

Secondary Nanorod Branching

Figure 3:
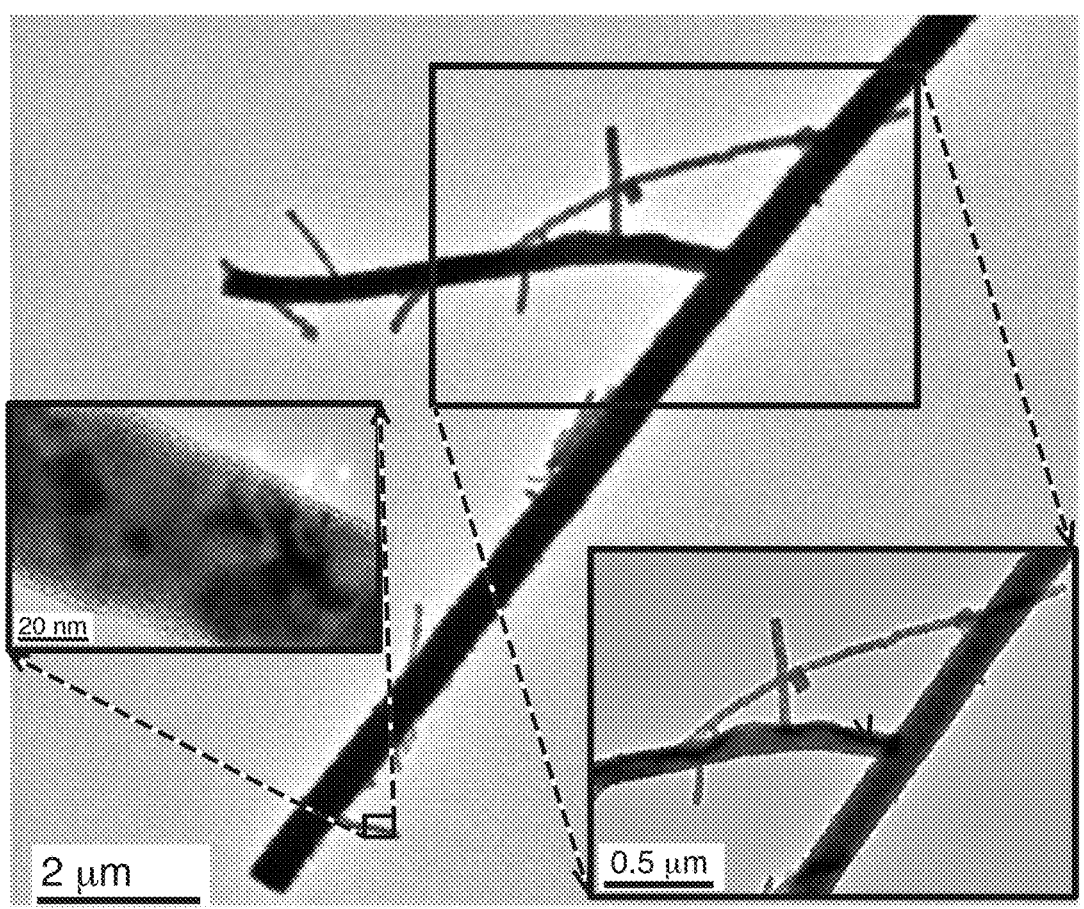
FIG. 3 is a low magnification TEM showing several secondary nanorods branching off the primary fibers.

Low magnification TEM (FIG. 3) and Scanning Electron Microscopy (SEM) images (FIG. 4a-4c) show several secondary nanorods branching off from the primary fibers. The secondary nanorod growth is anisotropic. The diameter of these secondary nanorods varied from a few tens of nanometers to 200 nm. The mean grain size for a secondary nanorod was 38 nm. The spatial distribution of these secondary nanorods was uneven and varied from fiber to fiber. The SEM images of sulfided Examples 1 and 2 indicate that the growth of nanorods is more widespread in Example 2, which has higher zinc content.

Resistance to Sintering & Spalling

Figure 4A:
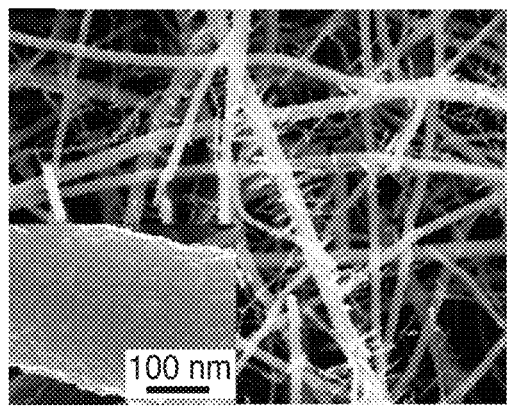
FIGS. 4a, 4b, and 4c are SEM images showing several secondary nanorods branching off the primary fibers.
Figure 4B:
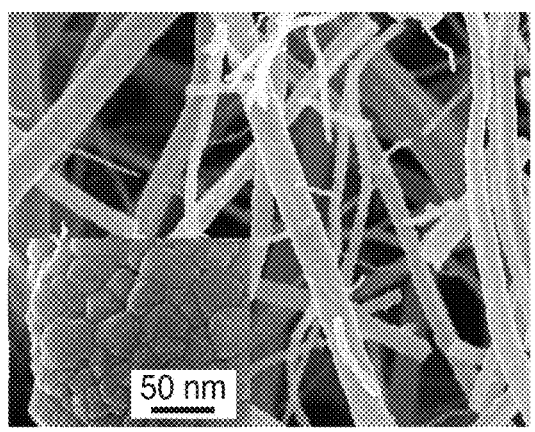
Figure 4C:
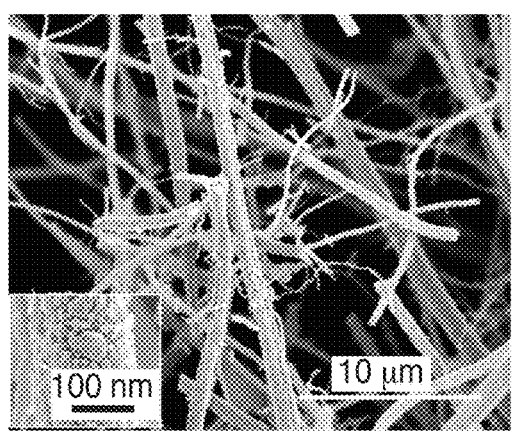
Figure 5A:
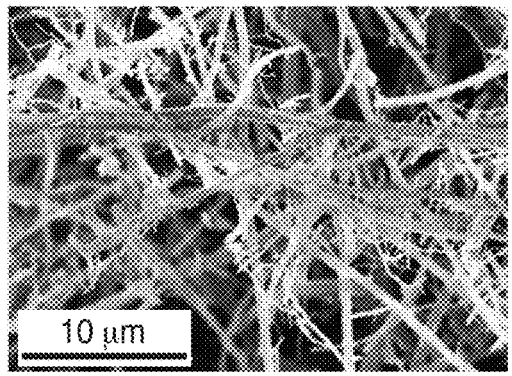
FIGS. 5a, 5b, 5c, 5d, and 5e are SEM and TEM images of Example 1 after multi-cycle experiments with a terminal oxidation step at different magnifications.
Figure 5B:
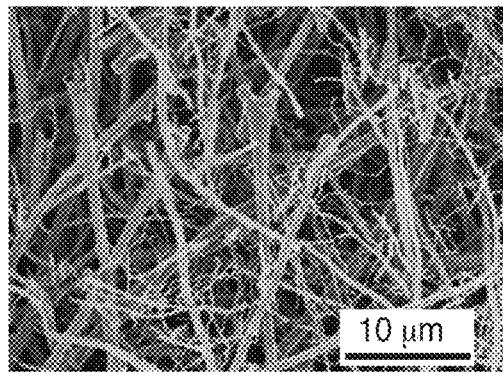
Figure 5C:
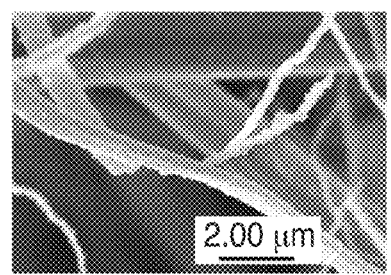
Figure 5D:
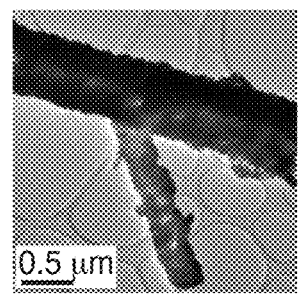
Figure 5E:
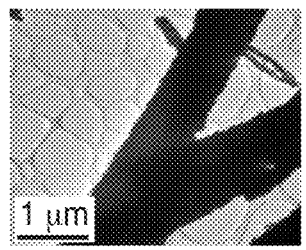

FIGS. 4a and 4b show the SEM images of Examples 1 and 2 after a single sulfidation step. The overall fibrous morphology of Examples 1 and 2 is well-preserved. HR-SEM images of single fibers (insets in FIG. 4a, 4b) show individual fibers having distinct non-overlapping grains and high density of grain boundaries. The average grain sizes were 88 nm for Example 2 and 79 nm for Example 1. FIG. 4c shows an SEM image of the multi-regenerated fibers (Example 1) and a high-magnification image of the fiber surface (inset). The fiber surface exhibits considerable grain disarray after regeneration, however, the overall fiber continuity is still maintained. The difference in apparent granularity is due to the differences in reaction-driven recrystallization and grain growth events associated with the different crystal phases being formed during sulfidation and oxidation. Overall fiber integrity after regeneration was not affected, as evident from FIG. 4c & FIG. 5a-5c, which show no fiber fragmentation after multi-regeneration. The isothermal nature of the sulfidation/oxidation reactions assist the preservation of fiber integrity. Table 1 shows the changes in the grain size distribution for Example 1 after single-step sulfidation, single-step regeneration, and multi-regeneration.

TABLE 1

Grain Size Distribution

| | | Percentage | | | |
|---|---|---|---|---|---|
| | | fresh | sulfided | regenerated | multi-regenerated |
| Feret Diameter (nm) | 40 | 12 | 7.5 | 19.5 | 15.5 |
| | 60 | 33 | 16 | 32 | 37 |
| | 80 | 30 | 14 | 20 | 17 |
| | 100 | 12 | 12 | 13 | 16 |
| | 120 | 6 | 8 | 8 | 4 |
| | 140 | 2 | 17 | 5 | 5 |
| | 160 | 0 | 6 | 2 | 3 |
| | 180≥ | 4 | 14 | 0 | 3 |

The average grain sizes for the fresh and sulfided samples were 70 nm and 79 nm, respectively and 69 nm after single-step regeneration. Even after multiple cycles, no substantial grain growth was evident (72 nm), demonstrating sorbent resistance to sintering.

Example 2, on the other hand, experienced relatively greater grain growth during sulfidation: from the fresh grain size of 40 nm to the sulfided grain size of 88 nm. Sorbent composition, i.e. the Zn/Ti ratio, is therefore a likely factor governing grain growth behavior. Nevertheless, as with the case of Example 1, regeneration of Example 2 led to restoration of the average grain size (45 nm,) which can be attributed to recrystallization during the regeneration step. Despite these changes in the grain size of Example 2, the mean diameter of the fresh, sulfided and regenerated fibers were found to be statistically similar (Table 2), indicating that, on average, the local volumetric changes are easily accommodated within the polycrystalline fiber, which permit the adsorbent to resist spalling.

TABLE 2

Fiber Size Distribution for Example 2

| | | Frequency | | |
|---|---|---|---|---|
| | | Fresh | Sulfided | Regenerated |
| Fiber diameter (microns) | 0.2 | 1 | 0 | 1 |
| | 0.28 | 15 | 3 | 5 |
| | 0.36 | 6 | 5 | 12 |
| | 0.44 | 7 | 13 | 13 |
| | 0.52 | 12 | 8 | 14 |
| | 0.6 | 10 | 10 | 7 |
| | 0.68 | 4 | 4 | 2 |
| | 0.76 | 4 | 2 | 1 |
| | 0.84 | 0 | 2 | 0 |
| | More | 1 | 0 | 0 |

Determination of Sulfur Form-Wurtzite

Figure 6:
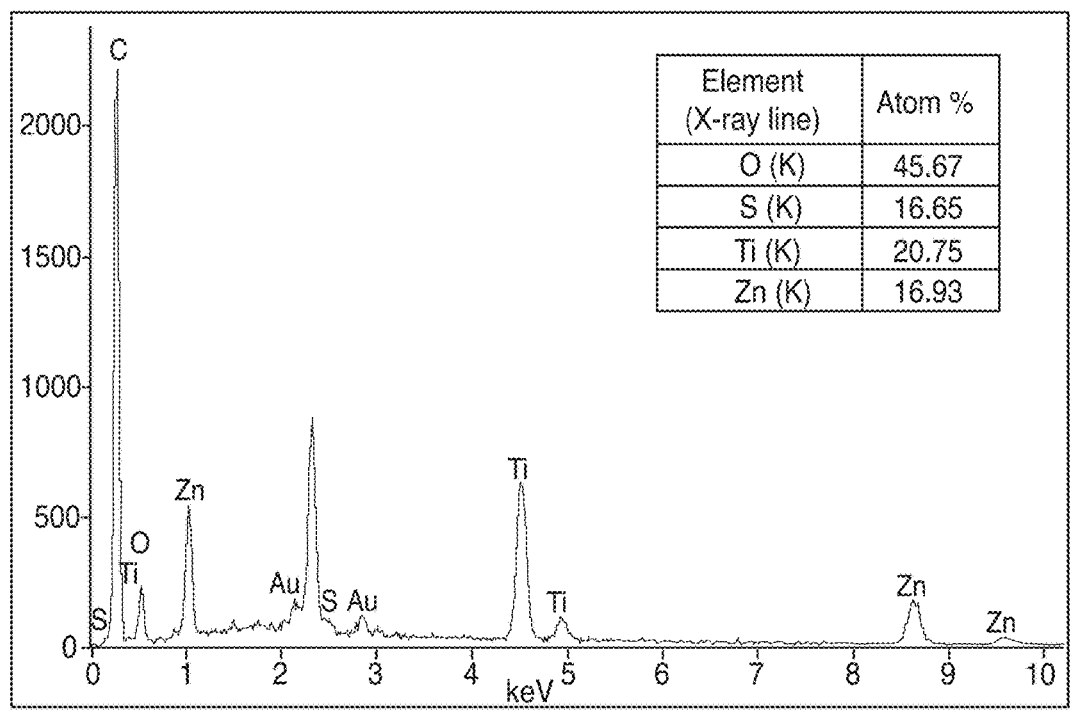
FIG. 6 illustrates an EDS analysis for fibers of Example 1 after single-cycle sulfidation.

Elemental analysis (EDS) revealed considerable amounts of sulfur in the sulfided samples (FIG. 6). XPS analysis was carried out to determine if this sulfur was ZnS or $ZnSO_4$. A detailed XPS scan around the sulfur spectral region, summarized in Table 3, shows only the sulfide peak (161.7 eV).

TABLE 3

| | Binding energies (eV) | | | |
|---|---|---|---|---|
| Possible sulphidation | S 2p | | Zn $2p_{3/2}$ | |
| products | Standard | Observed | Standard | Observed |
| ZnS | 161.7 | 161.67 | 1022.3 | 1022.13 |
| $ZnSO_4$ | 169.0 | none | 1022.9 | None |

Figure 7:
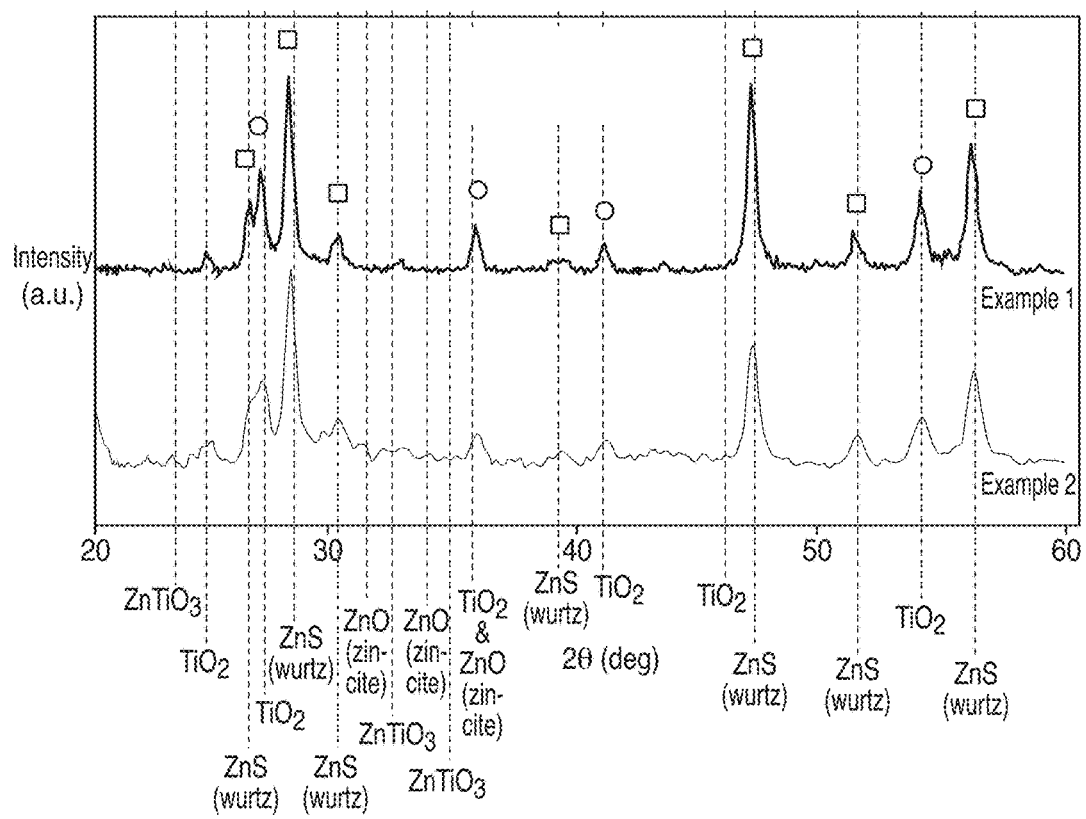
FIG. 7 illustrates an XRD pattern for fibers of Examples 1 and 2.

Lack of a specific intensity peak around the 168-170 eV region confirmed the absence of sulfate compounds. XRD analysis further confirmed sulphate suppression. Only hexagonal ZnS (wurtzite) and $TiO_2$ (rutile) were found in the XRD spectra (FIG. 7). No reflections corresponding to $ZnSO_4$, ZnO or $ZnTiO_3$ were detected, suggesting complete conversion to ZnS.

Example 3

Measurement of Reaction Kinetics

Single-cycle sulfidation tests were conducted to investigate reaction kinetics and associated structural and compositional changes occurring in the subject zinc titanate adsorbent upon $H_2S$ exposure at different temperatures. Reaction kinetics were measured using a thermogravimetric analyzer (Dupont 951 TGA) with a 200 mL min$^{-1}$ gas stream containing either 1% $H_2S$ in $N_2$ (by volume) during sulfidation or 3% of $O_2$ (in $N_2$) during regeneration. In order to keep the instrument electronics free of the corrosive $H_2S$, a separate stream of nitrogen purged the instrument via a standard gas inlet. Reaction between the samples and the relevant reactive gas mixture was allowed to proceed isothermally for a fixed duration at a pre-specified temperature.

Before sulfidation, both Examples 1 and 2 were reduced in 4% $H_2$ for comparing the resistance of the subject oxide based sorbents against reduction to metallic form. Greater resistance exhibited by Example 1 to weight loss during reduction was attributed to its higher titanium content. Consequently, Example 1 was chosen for sulfidation at four different temperatures: 500, 550, 600 and 650° C., whereas Example 2 was tested only at 600° C.

Figure 8:
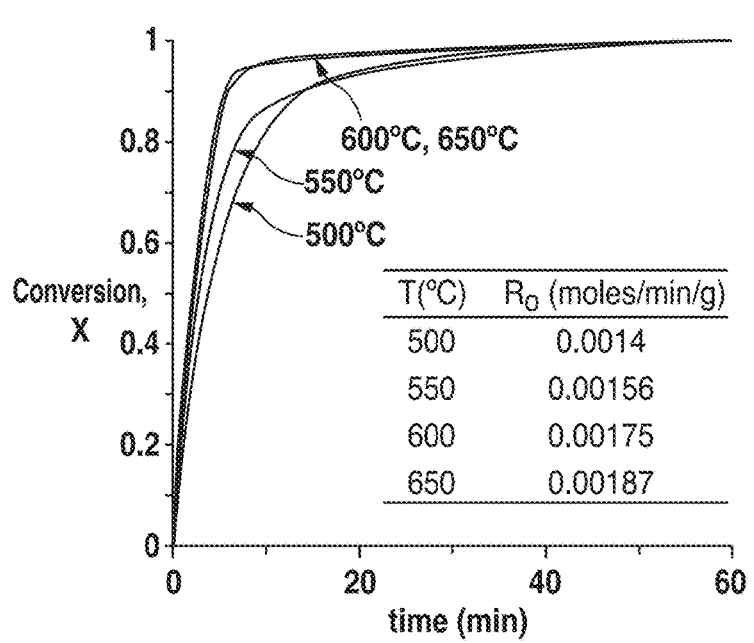
FIG. 8 illustrates reaction profiles (conversion vs. time) and the initial rate of weight change ($R_0$) for fibers of Example 1 at four different temperatures, and the observed linear dependence of $F_r (X)$ with time.
Figure 8:
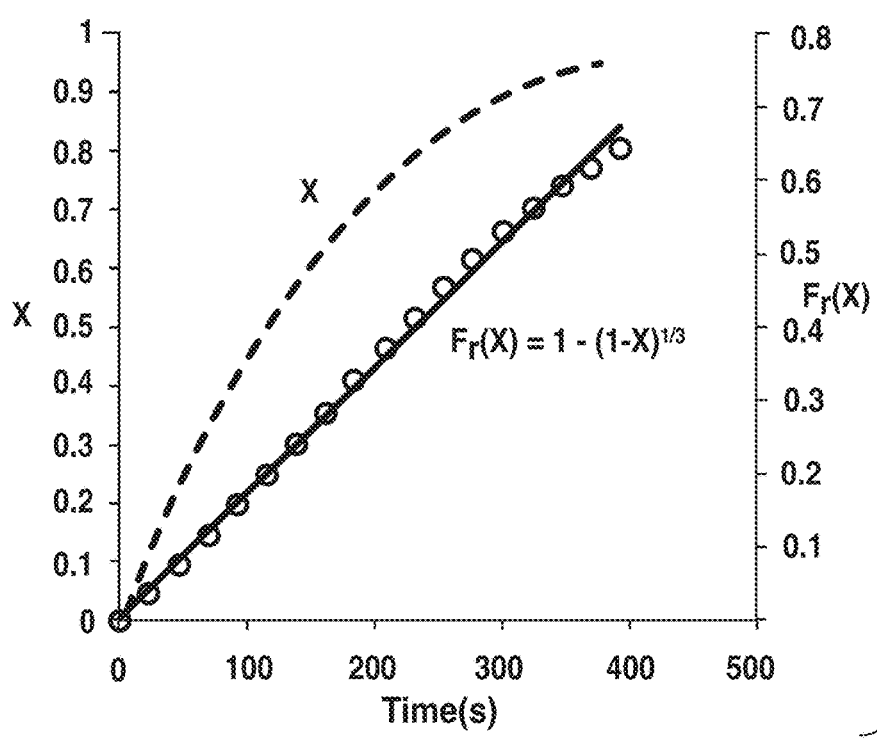

FIG. 8 compares the reaction profiles (conversion vs. time) and the initial rate of weight change ($R_0$) for Example 1 at four different temperatures. As expected, higher temperatures led to faster conversions. The reaction rates led to conversions in excess of 90% within the first 20 minutes for all the test temperatures. It is well-known by those skilled in the art that below 600° C., the reaction between pellet-based ZnO adsorbents and $H_2S$ stops well before full zinc oxide conversion has occurred, mainly due to growth of a non-porous zinc sulfide layer around the pellet. Diffusional resistance within the ZnS layer was identified as the primary limitation to the pellet's conversion.

For Example 2, the overall progress was controlled by the chemical reaction step for nearly the entire reaction length. This limit was determined by fitting the shrinking core model to the kinetic data. According to this model, if the diffusion through the product layer is not rate-limiting and the actual reaction step controls the overall rate exclusively, then time ($\tau$)-conversion (X) data can be represented by:

$$t = \tau \cdot F_r(X)$$

$$\text{where } F_\tau(X) = (1(1-X)^{1/3}) \qquad (2)$$

$F_\tau(X)$ is the conversion function obtained by assuming spherical grains. $\tau$ is a lumped parameter independent of X. The observed linear dependence of $F_r(X)$ with time (FIG. 8) for much of the reaction (X<0.94) suggests the absence of internal diffusion-resistance around the individual grains. This absence leads to an increase in the overall reaction rate over conventional transport-limited pellet-based sorbents.

Figure 9:
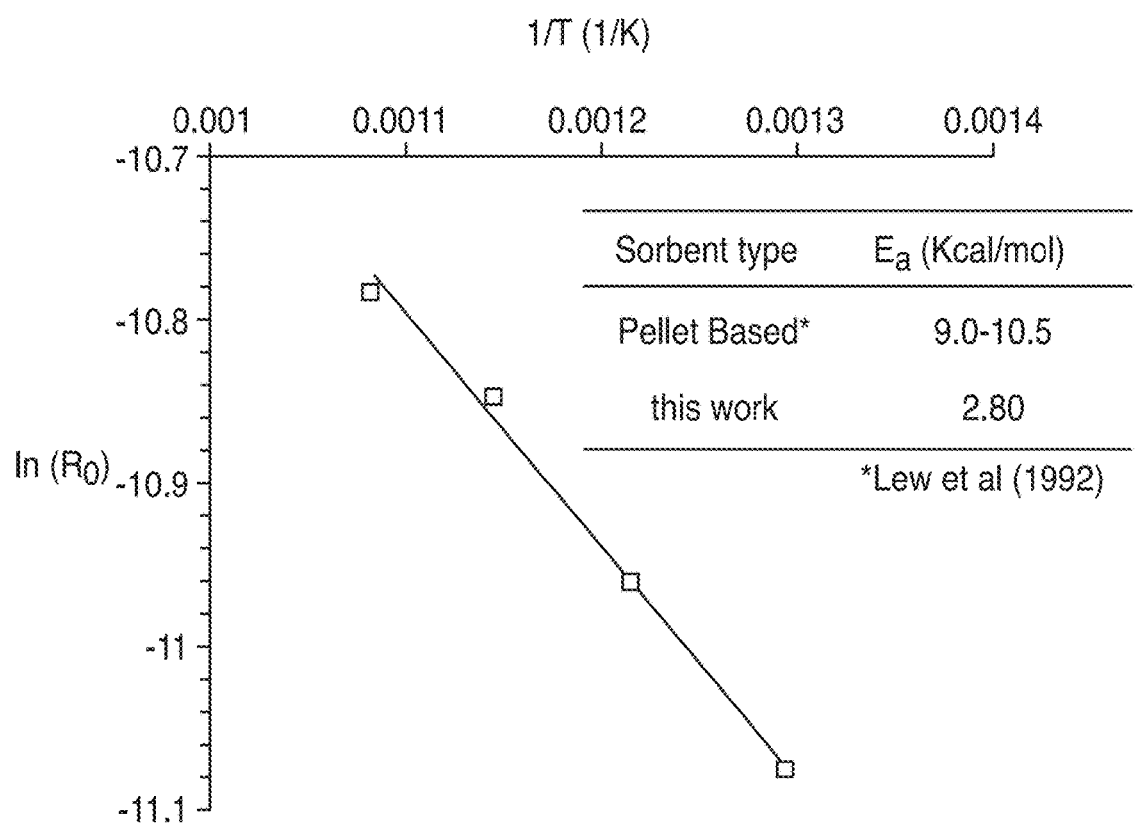
FIG. 9 illustrates an Arrhenius plot for the reactions shown in FIG. 8.

The activation energy ($E_a$) was estimated by measuring the initial weight change rate as a function of temperature at fixed $H_2S$ concentration. From an Arrhenius plot for Example 1 (FIG. 9), $E_a$ in the experimental temperature range was estimated to be 2.8 Kcal/mol, which is 3-fold lower than previously reported values for bulk Zn—Ti—O ($\approx$9.0-10.5 Kcal/mol). The lower energy barrier and resultant accelerated kinetics are likely due to the increased density of surface-active features associated with the nanocrystalline morphology, such as defect sites and crystal disorder.

Example 4

Multi-Cycle Sulfidation

Figure 10:
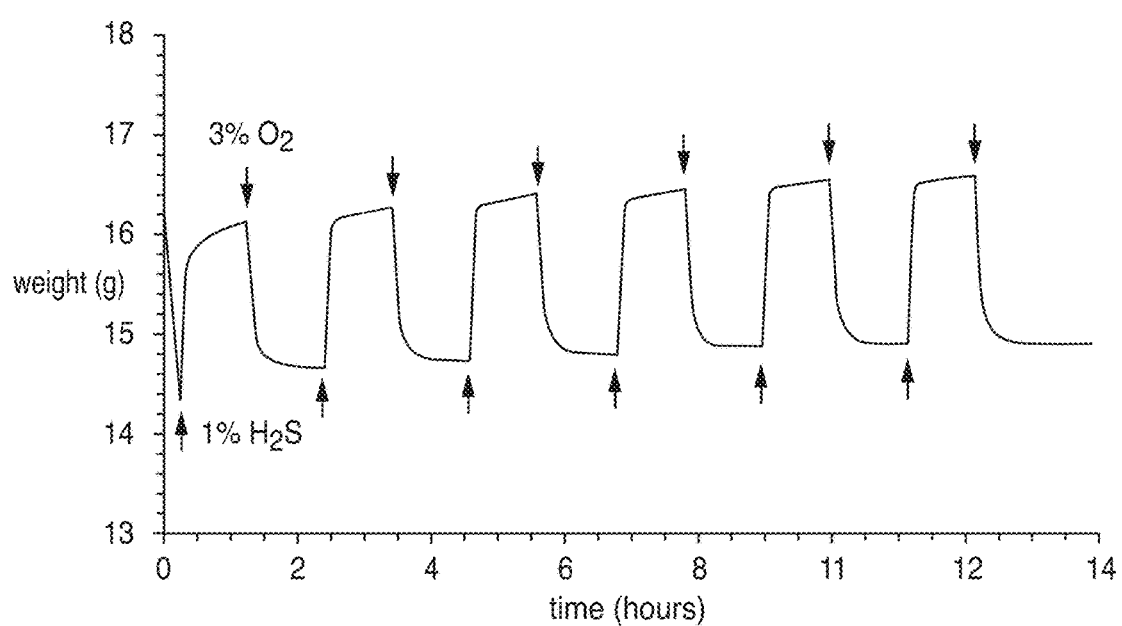
FIG. 10 illustrates multi-cycle tests of sulfidation/regeneration and the corresponding changes in sample weight.
Figure 11:
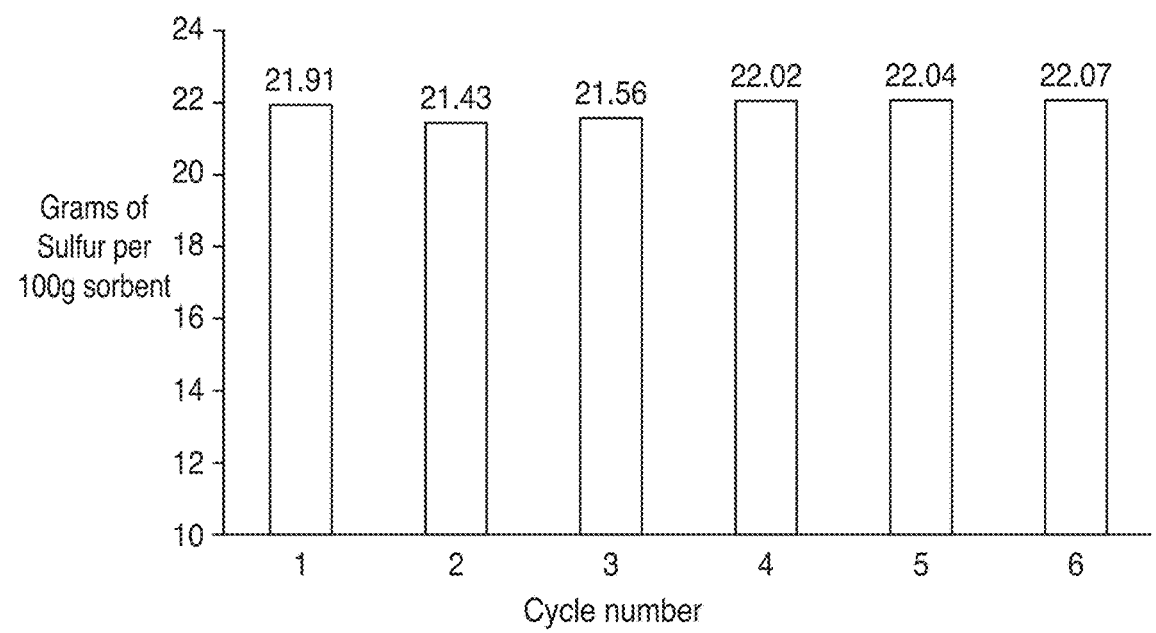
FIG. 11 illustrates sulfur removal capacity calculated using the observed weight gain during individual sulfidation cycles.
Figure 12:
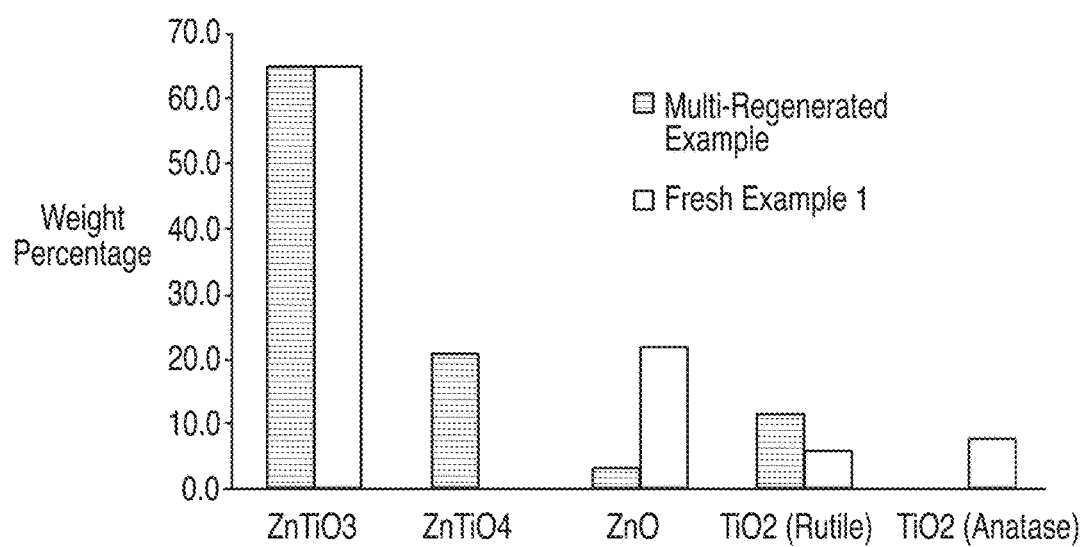
FIG. 12 illustrates a comparison of the compositions of fresh and multi-regenerated fibers of Example 1 in terms of the different crystalline phases.
Figure 13A:
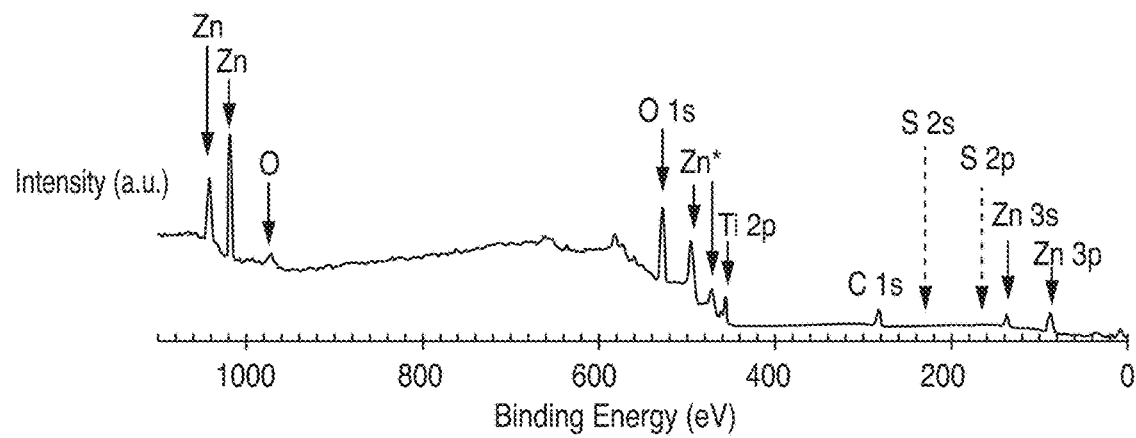
FIG. 13a illustrates an XPS spectrum of a zinc titanate adsorbent sample after multi-regeneration.
Figure 13B:
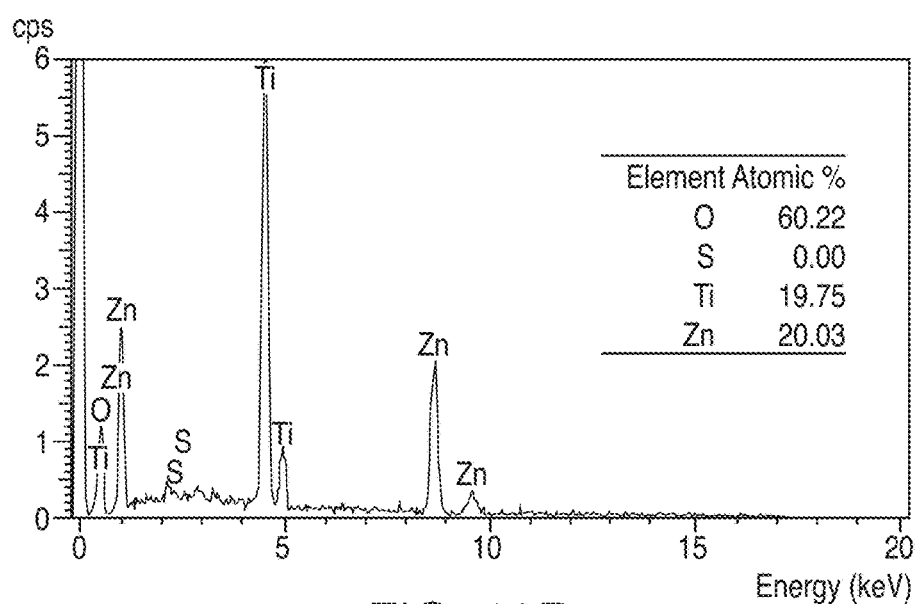
FIG. 13b illustrates an EDS spectrum of a zinc titanate adsorbent, confirming the absence of any sulfur in the multi-regenerated sample.

Multi-cycle sulfidation/regeneration tests were conducted at 650° C. on a pre-reduced specimen from Example 1 using TGA at the conditions of Example 3. FIG. 10 shows the corresponding changes in sample weight during cyclic operations. The initial drop in the weight was due to the partial volatilization of zinc metal that formed during the sorbent pre-reduction. After the initial reduction step, sulfidation and regeneration steps were performed in the absence of hydrogen to facilitate unambiguous analysis of the process kinetics. The gain in sorbent weight during the first half-cycle corresponds to the formation of zinc sulfide. The subsequent drop in weight is the result of S to O substitution during re-oxidation, which was carried out without raising the temperature. The rapid rise in the sorbent weight with full conversion during different sulfidation steps indicates minimal diffusional resistance and complete sorbent utilization. The equally rapid decrease in weight during oxidation shows that the regeneration reaction lengths are similar to the sulfidation reaction lengths. With pellet-based sorbents, the regeneration step is typically much longer due to transport limitations. FIG. 11 shows the sulfur removal capacity calculated using the observed weight gain during each sulfidation cycle. Consistent weight gain after each cycle reflects the reversible $H_2S$ adsorption capability of the sorbent. All the major crystalline phases present in fresh sorbent specimens were recovered in the multi-regenerated samples, as shown by XRD analysis (FIG. 12). Reflections corresponding to the crystal phases of zinc sulfide or sulfate were not found, suggesting complete regeneration. XPS and EDS analysis further confirmed the absence of sulfur in the multi-regenerated specimens (FIG. 13a-b).

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

We claim:

1. A process for producing a zinc titanate reactive adsorbent comprising electrospinning a solution, the solution comprising an organic zinc-containing compound and a titanium-containing compound wherein the organic zinc-containing compound comprises zinc acetate dihydrate and the titanium-containing compound comprises titanium (IV) isopropoxide, wherein the zinc titanate adsorbent comprises multiphase, polycrystalline nanofibers comprising $ZnTiO_3$, ZnO, $TiO_2$, and $Zn_2TiO_4$, and having a diameter ranging from 350 to 800 nm.

2. The process of claim 1, further comprising a sulfidation step operated at a sulfidation temperature and a regeneration step operated at a regeneration temperature, wherein the sulfidation temperature and the regeneration temperature are within 5° C. of each other.

3. The process of claim 2 wherein the sulfidation temperature and the regeneration temperature are the same.

* * * * *